United States Patent Office 3,536,413
Patented Oct. 27, 1970

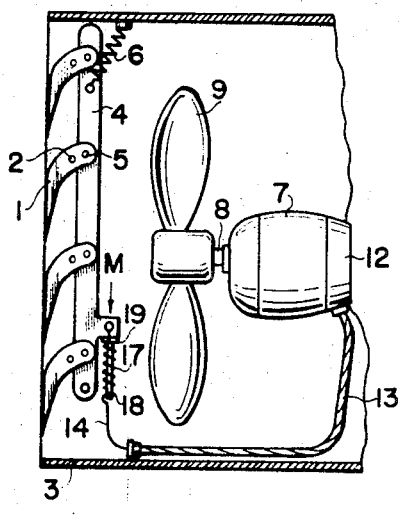
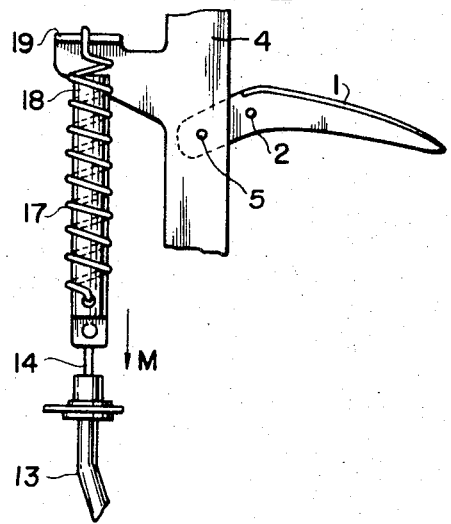
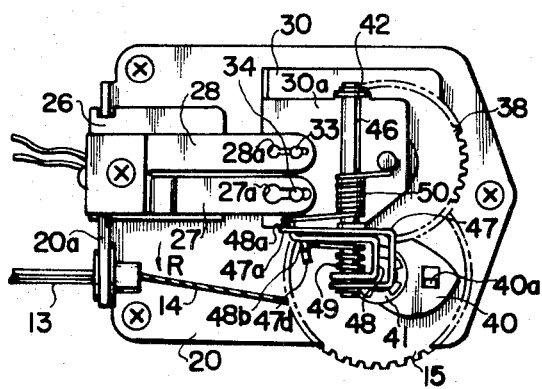

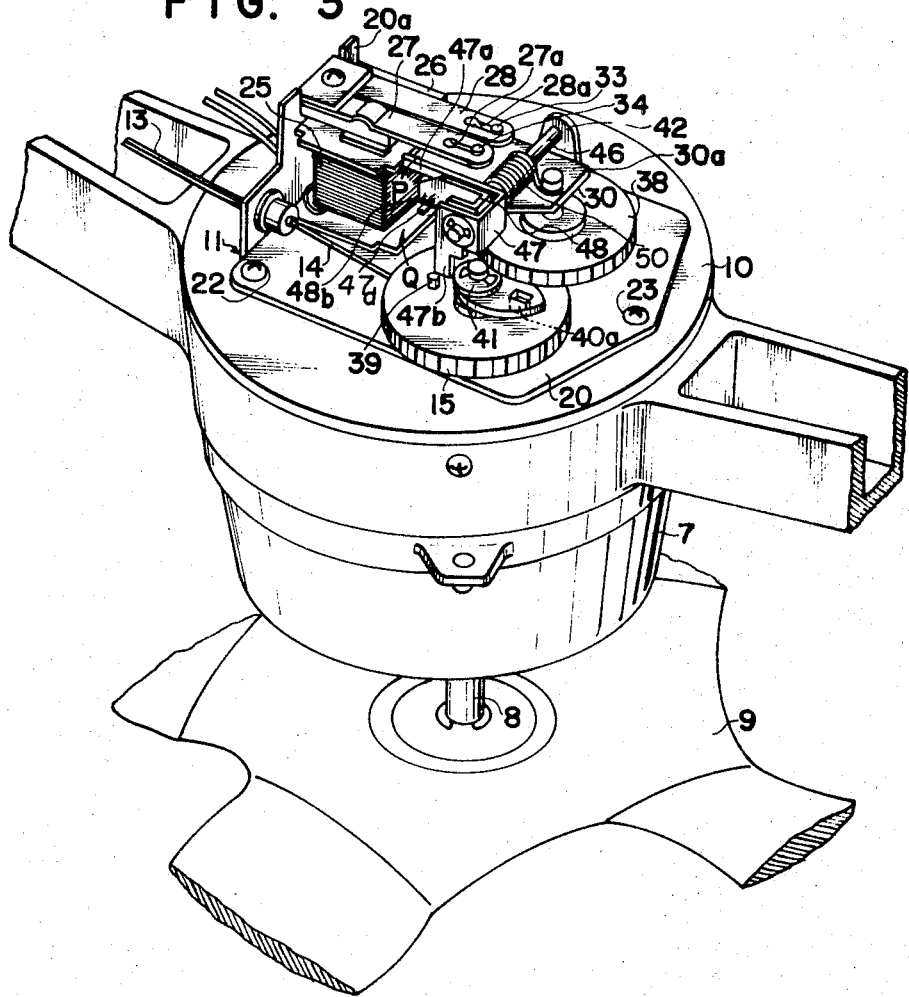

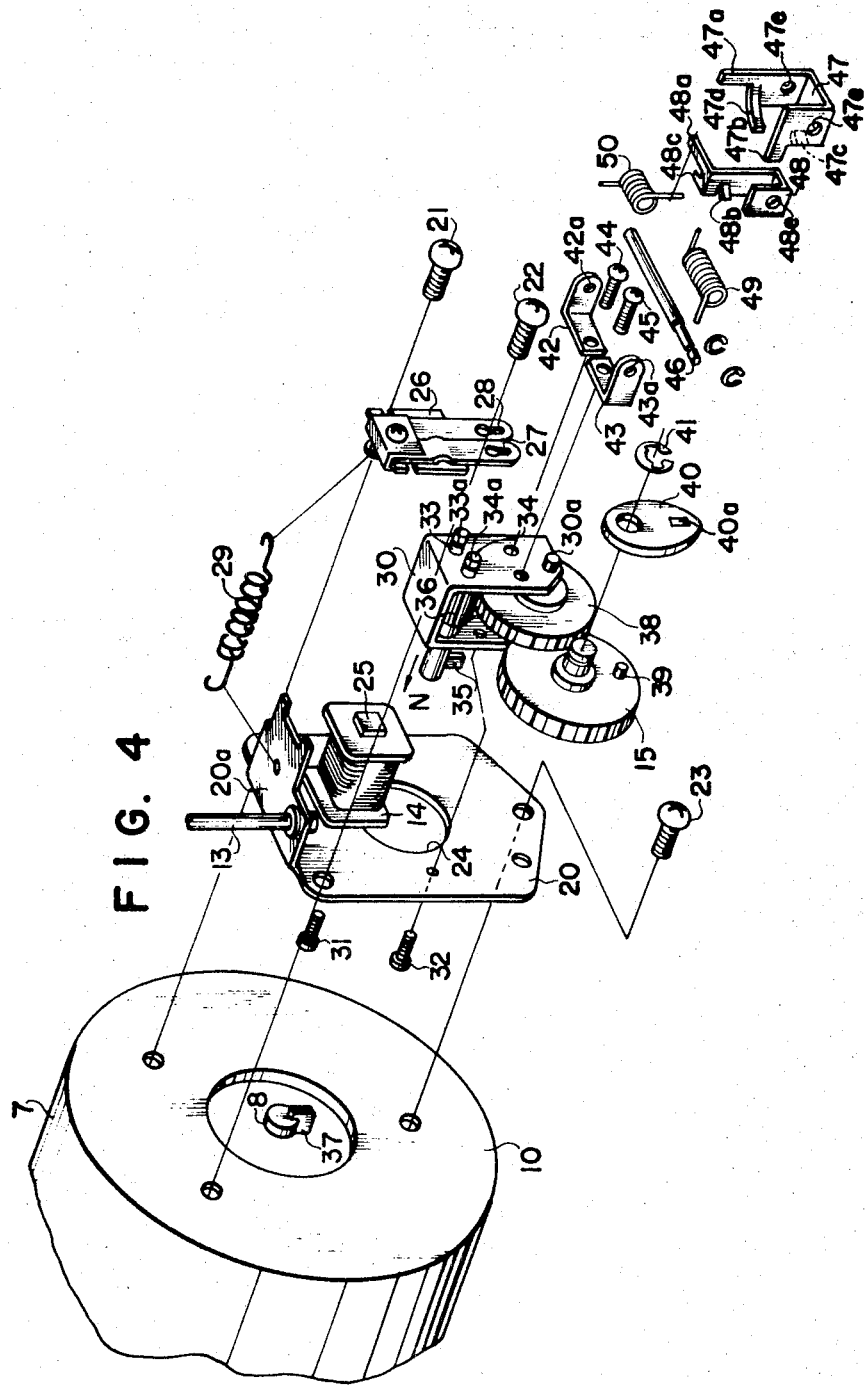

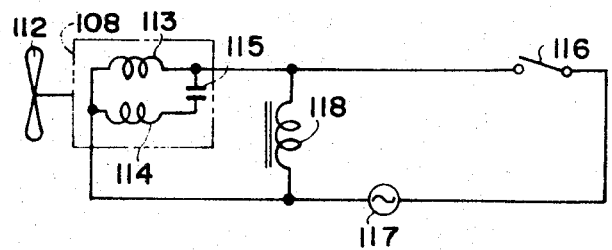
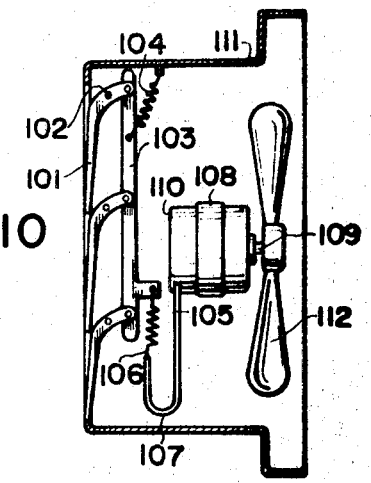
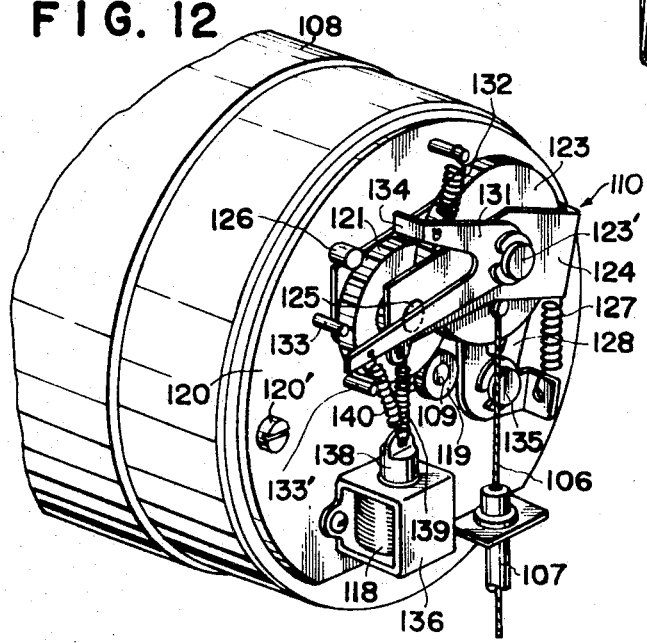

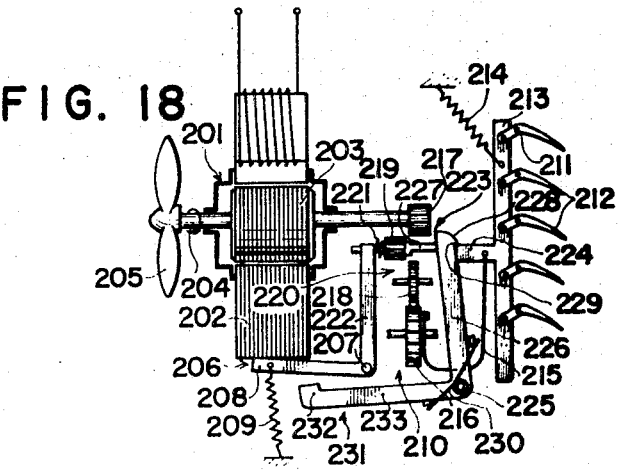
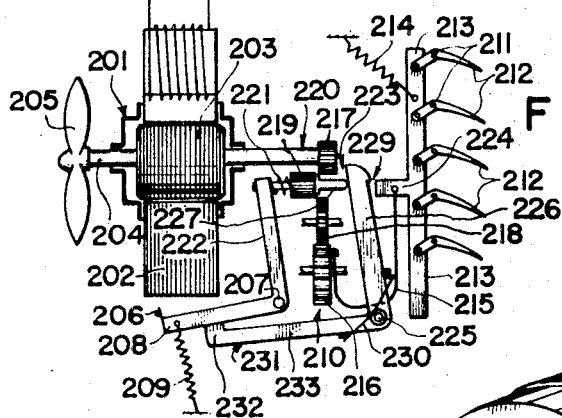
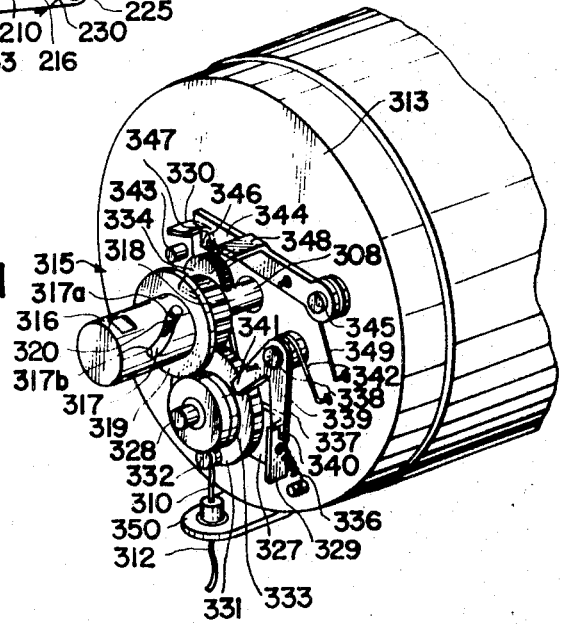

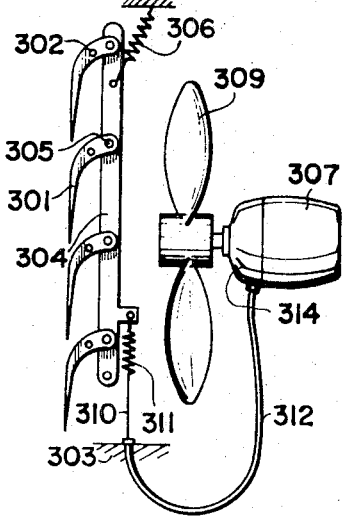
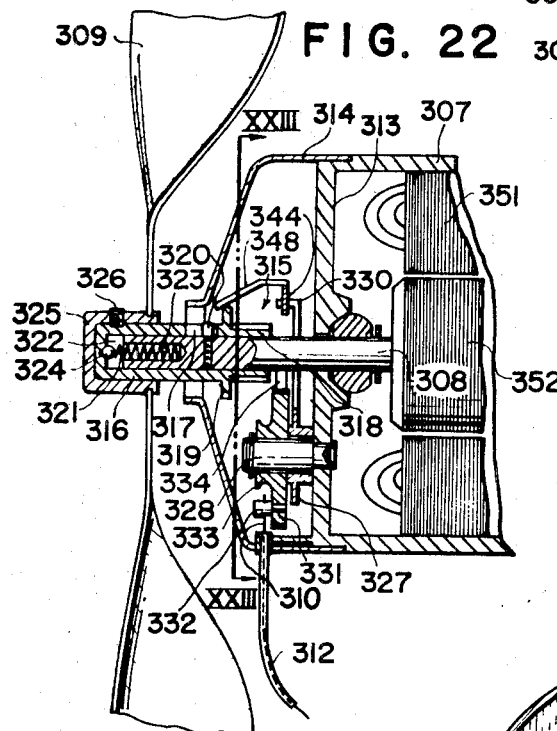
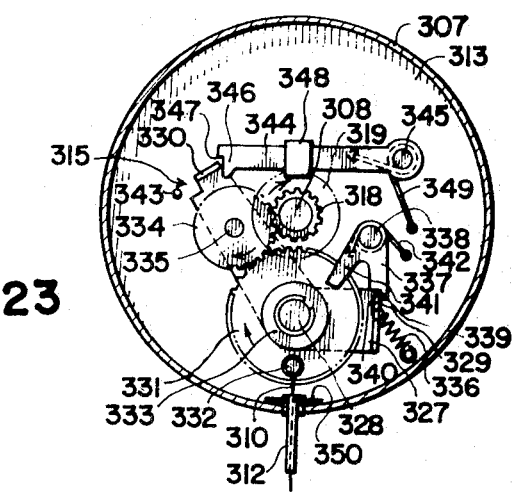

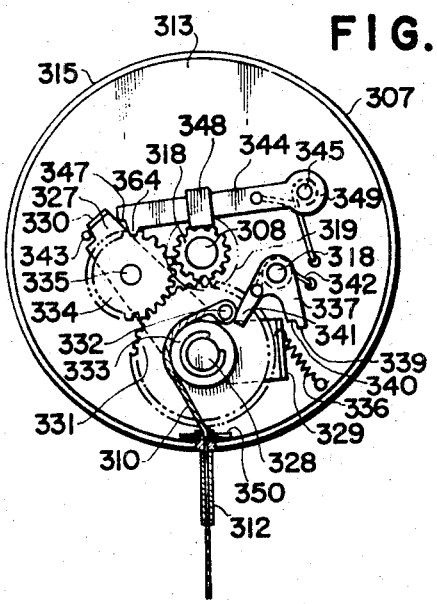
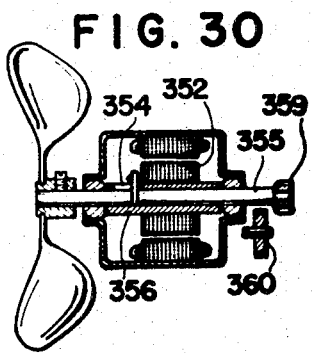
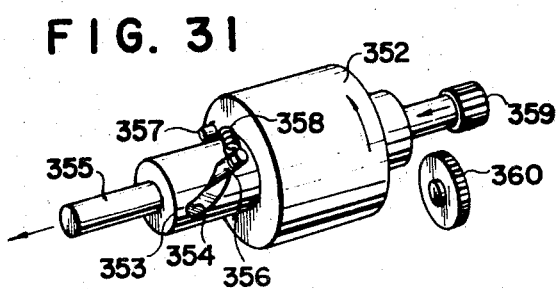
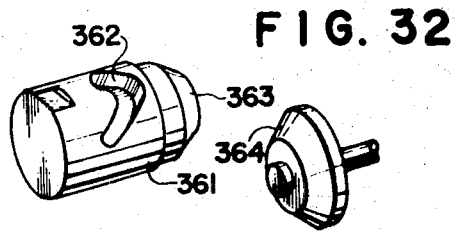

1

3,536,413
VENTILATOR
Hiroo Hosono and Shoji Omiya, Osaka, Japan, assignors to Matsushita Electric Industrial Co., Ltd., Osaka, Japan, a corporation of Japan
Filed Feb. 24, 1969, Ser. No. 801,597
Claims priority, application Japan, Feb. 27, 1968, 43/13,249, 43/13,250, 43/15,698; Aug. 21, 1968, 43/60,294; Nov. 1, 1968, 43/79,706
Int. Cl. F01d 1/04, 9/02; F04d 29/46
U.S. Cl. 415—209                                    18 Claims

ABSTRACT OF THE DISCLOSURE

A ventilator equipped with a fan and a shutter, wherein shutter blades are automatically opened by utilizing the rotation of a fan motor when the motor was energized, the motor being isolated from a shutter blade opening mechanism after the shutter blades have been fully opened while the shutter blades being locked at the fully opened condition during ventilation, and the shutter blades are automatically closed by utilizing the energy stored during the opening operation thereof when the motor was de-energized.

---

The present invention relates to a ventilator comprising a fan rotor, an electromotor for driving the fan rotor, a frame provided with shutter blades, and a shutter control device for opening and closing the shutter blades in accordance with the operation and stoppage of the fan rotor.

In known ventilators equipped with a shutter, wherein the shutter blades are opened and closed in accordance with the operation and stoppage of the fan motor, the shutter blades are operated by a pull string which operates an on-off switch of the fan motor, or by a small electromotor or an electromagnet provided separately as the power source for operating the shutter blades. Still in another conventional ventilator of the kind, the shutter blades are opened by the wind pressure generated by the fan during the operation thereof and are closed by their own gravity when the fan comes to stoppage.

The ventilator of the pull string type has such disadvantages that the pulling operation of the string requires a relatively large force and that the installation of the ventilator is limited with respect to the position thereof because of the operational condition of the string.

The electromotor or the electromagnet as the power source for operating the shutter blades increases the cost of the ventilator and is uneconomical.

The shutter blades to be opened by the wind pressure are poor in the degree of opening and are readily subjected to sticking due to accumulation of oily dust.

Accordingly, the main object of the present invention is to provide an improved ventilator of the kind equipped with an automaticaly operated shutter wherein the above-mentioned disadvantages of the conventional ventilators are avoided.

Another object of the present invention is to utilize the power of the fan motor for the operation of the shutter blades thereby to accomplish positive operation of the shutter blades with a simple mechanism.

Still another object of the present invention is to provide a shutter control device positively operable in any positional condition of installation as well as in such

2 a ventilator that can be switched over between inhaling and exhaling operations or high speed and low speed operations.

Still another object of the present invention is to provide a shutter control device which can be constructed independently of the fan motor and readily attached to conventional fan motors, and accordingly is suited for mass production.

The abovementioned objects are attained, according to the present invention, by a ventilator comprising a fan rotor, an electromotor for driving the fan rotor, a frame provided with shutter blades, and a shutter control device for opening and closing the shutter blades in accordance with the operation and stoppage of the fan rotor, characterized in that said shutter control device comprises a clutch means adapted to be so actuated by a motor operation sensing means as to drivingly connect a shutter blade opening mechanism with a rotor shaft of said motor to open the shutter blades against an elastic resisting means, a clutch disengaging means adapted to disengage said shutter blades opening mechanism from said rotor shaft when the shutter blades have been fully opened, a shutter locking means adapted to be so actuated in synchronization with said disengagement of said shutter blade opening mechanism from said rotor shaft as to lock said shutter blade opening mechanism at the condition of the shutter blades being fully opened, and a locking releasing means adapted to be so actuated by said motor operation sensing means as to release said shutter locking means to allow the shutter blades being closed by said elastic resisting means.

In the accompanying drawing,

FIGS. 1 to 9 show a ventilator of a first embodiment of the present invention, wherein, FIG. 1 is a schematic side view of the ventilator with a portion of the frame being broken away;

FIG. 2 is an enlarged partial view of a buffer spring of the ventilator;

FIG. 3 is a perspective view of the shutter control device of the ventilator;

FIG. 4 is an exploded perspective view of the shutter control device;

FIG. 5 is a plane view of the shutter control device;

FIG. 7 is an end view of the shutter control device showing operating conditions thereof, several parts being omitted for simplicity;

FIG. 9 is an electric wiring diagram of the ventilator.

FIGS. 10 to 15 show a ventilator of a second embodiment of the present invention, wherein, FIG. 10 is a schematic side view of the ventilator;

FIG. 11 is an electric wiring diagram of the ventilator;

FIG. 12 is a perspective view of the shutter control device of the ventilator; and FIGS. 13, 14 and 15 are plane views of the shutter control device showing operating conditions thereof.

FIGS. 16 to 19 show a ventilator of a third embodiment of the present invention in schematic side views of various operating conditions thereof.

FIGS. 20 to 32 show a ventilator of a fourth embodiment of the present invention, wherein, FIG. 20 is a schematic view of the ventilator;

FIG. 21 is a perspective view of the shutter control device of the ventilator;

FIG. 22 is an axial section of the shutter control device and cooperating portions of the ventilator;

FIG. 23 is a plan view of the shutter control device taken along line XXIII—XXIII of FIG. 22;

FIG. 24 is an exploded perspective view of a clutch element of the shutter control device;

FIGS. 25 and 26 are perspective views of the clutch element in two operating conditions;

FIGS. 27, 28 and 29 are plane views of the shutter control device in various operating conditions;

FIG. 30 is a schematic axial section of a modified embodiment of the ventilator;

FIG. 31 is a perspective view of the clutch element of the modified embodiment; and FIG. 32 is a perspective view of another modified embodiment of the clutch element.

Figure 6A:
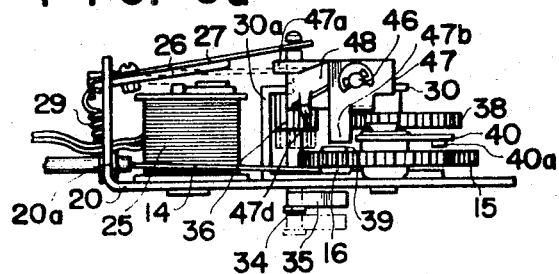
FIGS. 6a and 6b are side views of the shutter control device showing operating conditions thereof.
Figure 6B:
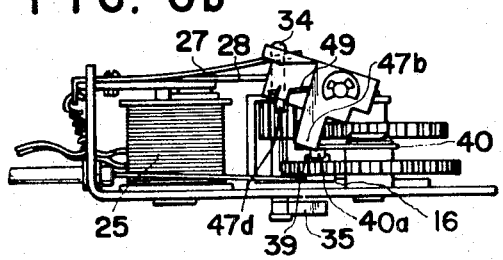

Now, the present invention will be explained in the form of some preferred embodiments with reference to the accompanying drawings.

First, referring to FIGS. 1 to 9, a first embodiment of the invention will be explained. In FIGS. 1 and 2, reference numeral 1 designates shutter blades each being pivotally mounted by a pin 2 at a ventilator frame 3 across an air passage defined by the frame. Each shutter blade 1 is pivotally connected with a connecting rod 4 by a pin 5, while the connecting rod is resiliently pulled upward by a spring 6 extended between an upper portion of the rod and the frame 3 so that the shutters are closed by the force of the spring unless they are otherwise restricted. Within the air passage defined by the frame, there is provided an electromotor 7 having a shaft 8, on which is mounted a fan rotor 9. At the rear end of the motor, there is mounted a shutter control device designated generally by 11 (FIG. 3), which is covered by a cover member 12.

The shutter control device, as described hereinunder, is selectively connected with the rear end of the shaft 8 via a clutch means actuated by an electromagnet so that the shutter blades are opened by utilizing the power of the motor 7. A flexible jacketed cable is extended from the shutter control device 11 to the shutter in such a manner that the inner wire 14 of the jacketed cable is connected at one end thereof with a pin 16 of an output gear 15 (FIGS. 5 and 6b) and at the other end thereof with the connecting rod 4 via a spring 17. The spring 17 is a coil spring which is slidably mounted around a guide rod 18 (FIG. 2) and is connected at its one end with the guide rod and at its other end with the connecting rod 4 in a slightly expanded condition so that an end of the guide rod is urged against a stopper leaf 19 of the connecting rod. Therefore, if the wire 14 is pulled in the direction indicated by M (FIGS. 1 and 2), the connecting rod is moved in the same direction against the tension of the spring 6 so as to open the shutter blades 1. And if the wire 14 is further pulled after the shutter blades are fully opened, the spring 17 is expanded so that the end of the guide rod 18 is pulled apart from the stopper leaf 19.

Now, the shutter control device 11 will be explained in detail hereinunder. Referring especially to FIGS. 3 and 4, the shutter control device 11 is arranged on a base plate 20, which in turn is mounted at the rear end of the motor 7 by machine screws 21, 22 and 23. The base plate has a central opening 24 facing the rear end of the motor shaft 8 and an angle portion 20a to which is fixed the outer tube of the jacketed wire 13.

An electromagnet 25 is mounted on the base plate 20, and an iron piece 26 adapted to be attracted by the magnet is mounted onto an edge of the angle portion 20a by notch and projection engagement. The end of the iron piece 26 remote from the magnet 25 is resiliently pulled by a tension spring 29 engaged at one end thereof with the angle portion 22a so that the iron piece 26 is resiliently pulled apart from the core of the electromagnet 25. The iron piece 26 is carrying two parallely arranged spring leafs 27 and 28, each being fixed at one end thereof to the iron piece.

A channel member 30 is mounted at the central portion of the base plate by machine screws 31 and 32 and is carrying a locking rod 33 and a transmission shaft 34 to be slidable in the axial direction thereof. The locking rod and the transmission shaft are formed of annular notches 33a and 34a adjacent one end thereof, respectively. The transmission shaft 34 is carrying a clutch projection 35 at the end opposite to the notched end and a pinion 36 at the central portion thereof. The spring leafs 27 and 28 are formed of openings 27a and 28a of a keyhole shape into which are engaged the notches 33a and 34a, respectively. The rear end of the motor shaft 8 is provided with a clutch projection 37 which is adapted to engage with the clutch projection 35 so as to transmit the rotation of the motor shaft to the transmission shaft 34 when the latter is shifted in the direction indicated by arrowhead N.

An intermediate gear 38 is rotatably mounted between the two legs of the channel member 30 and is meshing with the pinion 36. The intermediate gear 38 is accompanied by a coaxial pinion though it is not clearly shown in the figures, with which is meshing the aforementioned output gear 15 rotatably mounted on the base plate 20, thus constituting a reduction gear means for driving the wire 14 connected to the output gear 15 by the transmission shaft 34.

The output gear 15 is provided with a projection 39, and a cam plate 40 having a punched-out lug 40a adapted to engage with the projection 39 is rotatably mounted on the shaft of the output gear 15 and held by a washer 41 so that the cam plate is driven by the output gear when the projection 39 and the lug 40a have come into engagement.

Gearing pieces 42 and 43 are mounted onto the channel member 30 by machine screws 44 and 45, and a shaft 46 is carried through holes 42a and 43a of the bearing pieces 42 and 43. On the shaft 46 are rotatably mounted outer and inner levers 47 and 48 through respective holes 47e and 48e thereof. The outer lever 47 has two projections 47a and 47b in the planes of legs of the channel shaped lever, another projection 47c angularly inwardly bent from one of the legs and still another projection 47d circularly inwardly bent from the other of the legs. The inner lever 48 has two parallel long and short projections 48a and 48c angularly outwardly bent from one leg of the channel shaped lever and another projection 48b angularly inwardly bent from said leg. The inner lever 48 is interposed between the two legs of the outer lever 47 and are so cooperated with each other that the projection 47a lies over the projection 48a and the projection 47d lies under the leg of the inner lever, whereby clockwise rotation of the outer lever 47 seen in FIG. 6 shifts the inner lever 48 along the shaft 46 from rear to front of the paper of the same figure by the contact action of the projection 47d.

A spring 49 is coiled around the shaft 46 at the portion between the legs of the inner lever 47, one end of the spring being held by the projection 48b and the other end by the projection 47c. Further, around the shaft 46 and between the bearing piece 42 and the outer lever 47 is coiled a spring 50, one end of which is held by the projection 48a while the other end is held on the upper surface of the channel member 30. The spring 49 urges the outer lever 47 and the inner lever 48 in the directions P and Q (FIG. 3) respectively in the meaning of relative movement between the two levers, and in addition, the spring 49 acts as a compression spring in its axial direction so that the inner lever 48 is resiliently urged against the projection 47d of the outer laver 47. The spring 50 urges the inner lever 48 in the direction P with respect to the channel member 30. When the shutter control device 11 is in resting condition, an edge of the upper leg 30a of the channel member 30 is engaged into a notched portion formed between the projections 49a and 48c of the inner lever, whereby the inner lever is held by the upper leg of the chamber member. The outer lever 47, inner lever 48 and spring 49 constitute a clutch disengaging mechanism, the function of which is explained later.

Figure 9:
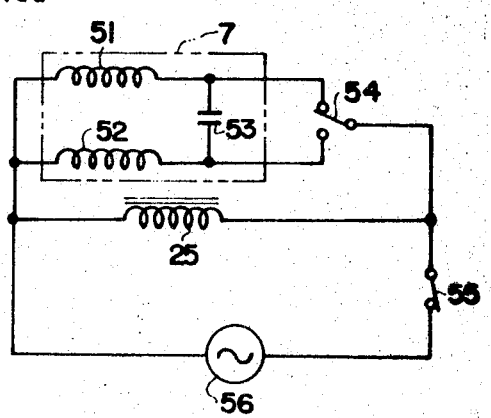

The electric wiring of this ventilator is shown in FIG. 9, wherein reference numerals 51 and 52 designate magnetic coils of the motor 7, which are adapted to be supplied with electric currents of shifted phases selectively via a condenser 53 and a change-over switch 54 for normal and reversed rotations and an on-off switch 55 from an alternating current source 56. Also under the control of the on-off switch 55 is the electromagnet 25 supplied with the electric current.

In this kind of ventilator wherein the shutter is automatically opened or closed according to the operation or stoppage of the fan rotor, the following conditions must be satisfied:

As the first condition, the clutch projection 95 of the transmission shaft 34 must be disengaged from the clutch projection 37 of the rotor shaft 8 when the ventilator is in the rest condition, since otherwise casual rotation of the fan rotor caused by the wind drives the shutter blades and likely opened them while the ventilator is not operated.

As the second condition, the clutch projections 35 and 37 must be engaged with each other at the time of starting the fan to open the shutter blades 1. (Clutch engaging operation.)

As the third condition, the clutch projections 35 and 37 must be disengaged from each other when the shutter blades 1 have been fully opened to release the motor 7 from the additional load for operating the shutter blades. (Clutch disengaging operation.)

As the fourth condition, the shutter control device 11 must be locked when the shutter blades have just been fully opened so that the shutter blades do not return to the shutter closing position when the clutch projections 35 and 37 are disengaged from each other.

As the fifth condition, the locking of the shutter control device must be released at the time of stopping the fan operation to allow the closing operation of the shutter blades.

Finally, as the sixth condition, the clutch projections 35 and 37 must be kept disengaged during the closing operation of the shutter blades.

The embodiment of the ventilator of the present invention described in the above operates as follows while satisfying the above-mentioned conditions.

When the on-off switch 55 is closed, the rotor shaft 8 of the motor 7 begins to rotate to drive the fan rotor 9, and at the same time the electromagnet 25 is energized to attract the iron piece 26, whereby the spring leafs 27 and 28 fixed to the iron piece are displaced from the position shown by solid lines to the position shown by broken lines in FIG. 6a, wherein the spring leafs in solid lines are shown in the condition of the magnet 25 being unenergized. By such displacement of the spring leafs, the locking rod 33 and the transmission shaft 34 connected with the spring leafs are axially displaced downward seen in FIG. 6a, the resulted condition being shown in solid lines in FIG. 7. As the results, the clutch projection 35 comes into engagement with the clutch projections 37, whereby the rotation of the rotor shaft 8 is transmitted to the transmission shaft 34. The rotation of the transmission shaft 34 is transmitted via the pinion 36 and the intermediate gear 38 to the output gear 15, and by the rotation of the output gear 15, the inner wire 14 is wound up around a reel portion formed as a part of the output gear. As the inner wire 14 is pulled through the outer tube of the jacketed cable 13, the connecting rod 4 is pulled via the spring 17 in the direction M against the tensile force of the spring 6, whereby the shutter blades 1 are opened.

On the other hand, as the output gear 15 rotates, the projection 39 provided and the gear comes into contact with the punched-out lug 40a of the cam plate 40, whereby the cam plate is rotated together with the output gear 15. As the cam plate 40 is rotated, it comes into contact with the projection 47b of the outer lever 47 and gradually urges the projection outward so that the outer lever is gradually turned in the direction Q (FIG. 3) against the reaction of the spring 49. As the outer lever 47 is turned in the direction Q, the spring 49 is tightened on one hand and the circularly bent projection 47d urges the inner lever 48 along the shaft 46 while axially compressing the spring 49 on the other hand, whereby the engagement of the projection 48c with the edge of the upper leg 30a of the channel member approaches the verge of disengagement.

Figure 7:
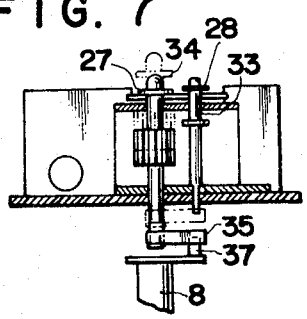
Figure 8A:
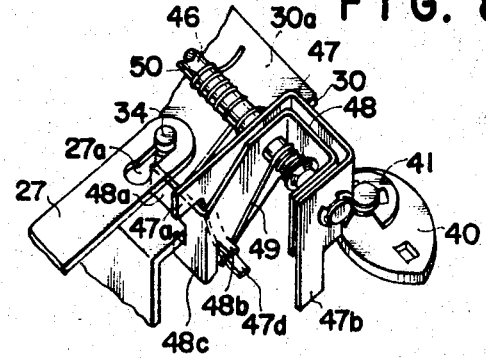
FIGS. 8a, 8b and 8c are partial perspective views of the clutch disengaging means of the ventilator showing operating conditions thereof.
Figure 8B:
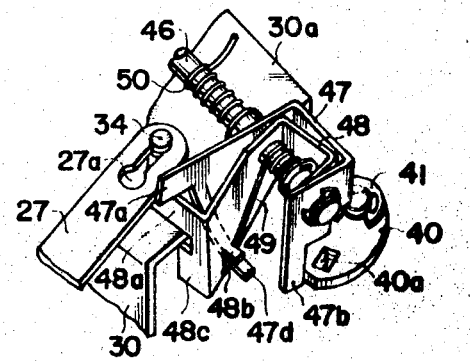
Figure 8C:
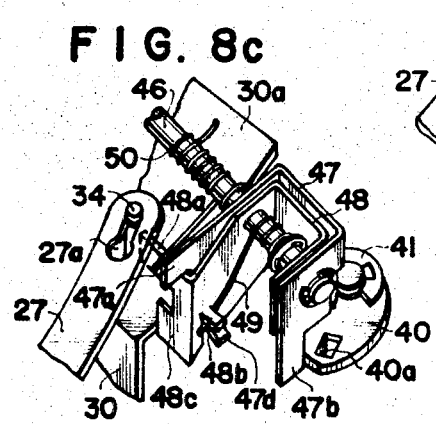

After the shutter blades 1 have been fully opened, an additional short length of the inner wire 14 is wound up by the output gear 15 under an expansion of the buffer spring 17. Here at last the projection 48c of the inner lever is released from the engagement with the edge of the upper surface 30a of the channel member 30, and the inner lever 48 is instantaneously turned in the direction Q by the force of the spring 49, whereby the projection 48a abuts against the underside of the spring leaf 27 and instantaneously pushes up the spring leaf from the position shown by broken lines in FIG. 6a to the position shown in FIG. 6b. By the spring leaf 27 being pushed up to the position shown in FIG. 6b, the transmission shaft 34 connected with the spring leaf 27 is axially shifted upward seen in FIG. 6, whereby the clutch projection 35 of the transmission shaft is disengaged from the clutch projection 37 of the rotor shaft 8 and at the same time comes into engagement with the locking rod 33 which thus checks the rotation of the transmission shaft 34. This locking operation occurs since the electromagnet 25 is still energized and the iron plate 26 is kept attracted thereto, whereby the locking rod 33 is shifted downward as shown in FIG. 7. This locking operation is necessary because otherwise the disengagement of the clutch projection 35 from the clutch projection 37 allows the rewinding of the inner wire 14 from the output gear 15 by the force of the springs 6 and 17 so as to close the shutter blades 1. By the locking operation, the shutter control device 11 is kept in the locked condition where the shutter blades are fully opened.

In the abovementioned locked condition the fan rotor 9 is continuously rotated by the motor 7, the rotational direction of the motor being selectively changed over by the change-over switch 54 while keeping the shutter blades in the fully opened condition. Thus, by the change-over switch, the ventilator is selectively operated as a inhaling ventilator or an exhaling ventilator.

Here it must be attended to that the clutch projection 35 engages at no time point simultaneously with the clutch projection 37 of the rotor shaft 8 and the locking rod 33, since otherwise the transmission shaft 34 is driven by the motor 7 in the locked condition, and therefore, there is the danger of breakage of the motor and/or the shutter control device 11. For this purpose, the axial shifting stroke of the locking rod 33 is determined to be smaller than that of the transmission shaft 34. In another solution, the length of the locking rod 33 may be determined to be smaller than that of the transmission shaft 34.

Now, if the on-off switch 55 was opened, the motor 7 stops rotation and at the same time the electromagnet 25 is deenergized, whereby the iron piece 26 is returned to its starting position shown by solid lines in FIG. 6a by the tensile force of the spring 29 and the restoring force of the spring leaf 27 which was bent by being pushed up by the projection 48a. As the results, the locking rod 33 is axially shifted upward seen in FIGS. 6 or 7, whereby the clutch projection 35 of the transmission shaft 34 is released from the engagement with the locking rod 33. Therefore, the locking action applied to the inner wire 14 disappears, whereby the connecting rod 4 is pulled in the direction opposite to M by the tensile force of the spring 6 while closing, the shutter blades 1, and at the same time the inner wire 14 is rewound from the output gear 15 while restoring the cam 40, intermediate gear 38, pinion 36 and transmission shaft 34 to the starting positions thereof. As the cam 40 is restored to its starting position, it retreats from the projection 47b of the outer lever 47, and therefore, the inner lever 48, together with the outer lever 47, is turned in the direction P by the force of the spring 50 and is again locked to the channel member 30 by the projection 48c being engaged with the edge of the upper leg 30a of the channel member. Thus, the clutch disengaging mechanism is restored.

Since, as described in the above, the inner wire 14 is wound up by the output gear 15 for a length even after the shutter blades 1 have been fully opened under the expansion of the buffer spring 17 at the time of starting the ventilator, it is guaranteed that the clutch disengaging mechanism is certainly restored at the end of operation of the ventilator even if the shutter blades 1 are not completely closed because of intervention of dust. If the clutch disengaging mechanism is not restored when the ventilator is again put into operation, the spring leaf 27 is still kept in the pushed up condition by the projection 48a, whereby the electromagnet 25 is required to be so strong as to attract the iron piece 26 which is suspended apart from the magnet core, against the force of the spring 27.

The direction of rotation of the output gear 15 differs according to the direction of rotation of the motor 7 at the time of starting. However, since the output gear 15 is adapted to wind up the inner wire 14 in the same way regardless of the direction of rotation thereof, the shutter control device 11 operates in the same way regardless of the direction of rotation of the motor 7.

The reason for not forming the cam 40 as an integral portion of the output gear 15 but for providing some clearance between the two components in the rotational engagement therebetween is to accomplish such operations that even if the output gear 15 started its rotation when the inner wire 14 was somewhat loosened, the cam 40 urges the projection 47b of the outer lever 47 to lock the shutter control device 11 after the shutter blades 1 have been fully opened, and that, in case of the reversible ventilator, the output gear 15 can rotate more than a half rotation in both directions to fully wind up the inner wire 14.

It will be appreciated from the foregoing description of an embodiment of the present invention that the ventilator of the present invention can be mounted in any of vertical, horizontal and inclined positions, that the shutter is certainly opened and closed automatically according to the operation and stoppage of the fan motor, that the abovementioned automatic operation of the shutter is certainly accomplished regardless of the change of rotational direction of the fan motor effected by a direction change-over switch or the change of speed of the fan motor which can be readily effected by a speed change-over switch if required, and that since the fan motor and the shutter control device are independently constituted, the shutter control device of the present invention is readily applicable to conventional fan motors and is suited for mass production.

Furthermore, the ventilator of the present invention can be freely changed over from inhaling operation to exhaling operation and vice versa or from high speed operation to low speed operation or vice versa according to the purpose of operation while keeping the shutter blades in the fully opened condition. The on-off switch and the change-over switch or switches can be incorporated into a compact single control switch to improve the simplicity of the ventilation equipment.

Another embodiment of the present invention will be explained hereinunder with reference to FIGS. 10 to 15.

In FIG. 10, shutter blades 101 are each pivotally mounted by a pin 102 at a ventilator frame 111 and are each pivotally connected with a connecting rod 103 which is resiliently biased upward seen in FIG. 10 by a tension spring 104. The connecting rod 104 is operatively connected via buffer spring 105 and a jacketed cable 107 with a shutter control device 110 mounted at the rear end of a fan motor 108 which drives a fan rotor 112 via a rotor shaft 109. The spring 104 is so designed as to fully close the shutter blades 101 if the connecting rod 103 is not otherwise controlled, and the spring 105 is so designed as to be able to compensate all of the shutter opening stroke of an inner wire 106 of the jacketed cable 107 if the shutter blades 101 have stuck unmovably because of oily dust, etc.

In FIG. 11 showing the electric wiring of the ventilator shown in FIG. 10, reference numerals 113 and 114 designate main and auxiliary coils of the motor 108, respectively, the former being connected via an on-off switch 116 to an alternative current source 117 while the latter being connected in the same way but via additional interposition of a phase advancing condenser 115. Also under the control of the on-off switch 116 is an electromagnet coil 118 connected to the current source 117 in parallel with the motor 108. The coil 118 is the coil of an electromagnet which is a component of the shutter control device 110 and will be described hereinunder.

Referring to FIGS. 12 to 15, the shutter control device 110 includes a pinion 119 mounted at the rear end of the rotor shaft 109 of the motor 108. A base plate 120 is mounted to the rear end of the motor 108 by machine screws 120' and is carrying all components of the shutter control device 110. An intermediate gear 121 including two coaxial gears, the larger one of which is adapted to cooperate with the pinion 119, is rotatably mounted on a shaft 125 carried by a channel shaped carrier member 124, which in turn is pivotally mounted on a pin 123' firmly mounted to the base plate 120. The pin 123' is also rotatably carrying an output gear 123 between the two legs of the carrier member 124. The output gear 123 is constantly meshing with the smaller one of the intermediate gear 121, whereby a reduction gear train extending from the pinion 119 to the output gear 123 can be constituted. The output gear 123 is provided with a coaxial reel portion 122 which is adapted to wind up the inner wire 106. When the carrier member 124 is turned clockwise seen in FIGS. 13 to 15 and is abutting against a stopper 126 by one leg thereof positioned adjacent the base plate 120, the intermediate gear 121 is disengaged from the pinion 119.

Figure 13:
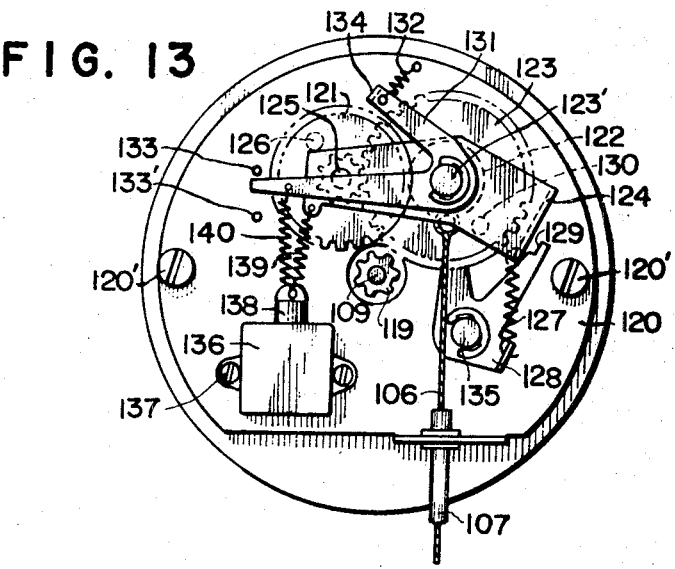
Figure 14:
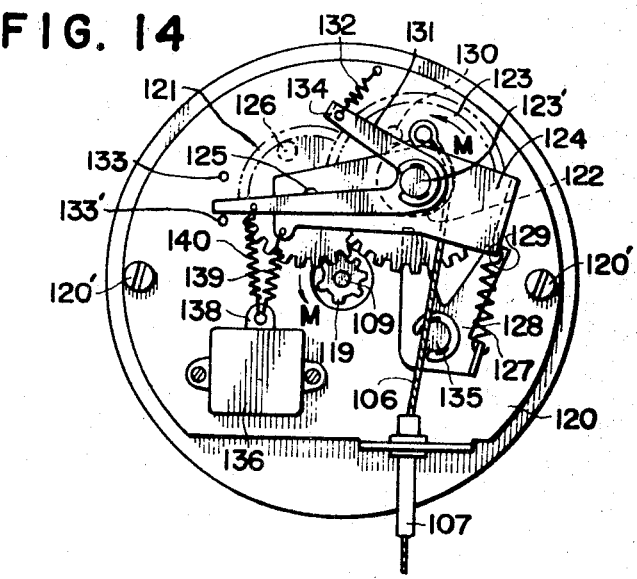
Figure 15:
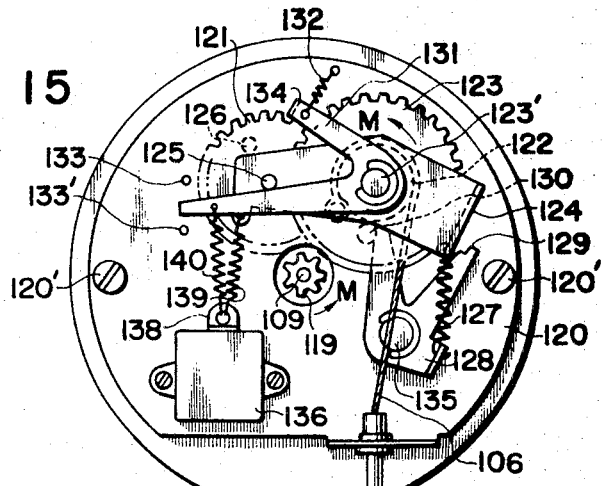

A tension spring 127 is expanded between an end of the carrier member 124 and a first locking member 128 pivotally mounted on a pin 135 carried by the base plate 120 in a manner that the carrier member is biased to turn clockwise while the first locking member is biased to turn anticlockwise seen in FIGS. 13 to 15. The first locking member 128 acts to hold the intermediate gear 121 in engagement with the pinion 119 by supporting said end of the carrier member 124 with a shoulder portion 129 as shown in FIG. 14. The output gear 123 carries a projection 130 which is adapted to engage with the first locking member 128 and to turn the first locking member clockwise seen in FIG. 15 so that the strutting engagement of the first locking member with the carrier member is released when the output gear has rotated enough to wind up a predetermined length of the inner wire 106 to open the shutter blades.

A second locking member 131 is pivotally mounted at the end of the pin 123' and is biased in turn clockwise seen in FIGS. 13 to 15 by a tension spring 132 until it abuts against a stopper 133. The second locking member 131 has a locking projecting 134 which is adapted to engage into two adjacent teeth of the larger gear of the intermediate gear 121 if the second locking member is turned anticlockwise until it abuts against a stopper 133' when the carrier member is turned clockwise as shown in FIG. 15, thereby to check the rotation of the intermediate gear 121.

An electromagnet 136 having the coil 118 is mounted onto the base plate 120 by machine screws 137 and is carrying a core plunger 138 adapted to be drawn into the coil when the latter is energized. The plunger 138 is expanded upward seen in FIGS. 13 to 15 by tension springs 139 and 140, the former spring being connected with the carrier member 124 and the latter spring being connected with the second locking member 131. The plunger 138 is shifted upward as shown in FIG. 13 when the coil 118 is not energized, this upward shifting of the plunger being supported by the spring 132 biasing the second locking member 131 to turn clockwise and the spring 127 biasing the carrier member 124 to turn also clockwise seen in FIG. 13.

The drawing stroke of the core plunger 138 is determined to be enough to change the condition of the components of the shutter control device 110 from that shown in FIG. 13 to that shown in FIG. 14. In other words, by the plunger 138 being drawn into the coil 118, the second locking member 131 leaves the stopper 133 and is turned anticlockwise until it abuts against the stopper 133', while the carrier member 124 leaves the stopper 126 and is turned also anticlockwise until the larger gear of the intermediate gear 121 comes into engagement with the pinion 119.

The spring 139 is so designed that when the plunger 138 was drawn into the coil 118 as shown in FIG. 14, it exerts such a tensile force to the carrier member 124 that is enough to turn the carrier member anticlockwise from the position shown in FIG. 13 to the position shown in FIG. 14 against the tensile force of the spring 127. In the same manner the spring 140 is designed to turn the second locking member 131 anticlockwise against the tensile force of the spring 132 when the plunger 138 was drawn into the energized coil 118. On the other hand, the spring 132 is so designed that it turns the second locking member 131 clockwise to unlock the intermediate gear 121 when the coil 118 was deenergized and the plunger 138 was released at the operating condition shown in FIG. 15.

In this embodiment, the rotor shaft 109 of the fan motor 108 rotates only in one direction indicated by arrowhead M or anticlockwise seen in FIGS. 13 to 15. If the pinion 119 is meshed with the intermediate gear 121 and is rotated anticlockwise, the output gear 123 is driven also anticlockwise, whereby the inner wire 106 is wound up around the reel portion 122. As the inner wire is wound around the reel portion, a gradually increasing tensile force is generated in the inner wire, the tensile force being at its maximum equal to the tensile force of the buffer spring 105 at its most expanded condition. The tensile force of the inner wire exerts a clockwise moment to the output gear 123. Since the rotation of the output gear 123 is restricted by meshing with the intermediate gear 121 which in turn is meshing with the pinion 119, the clockwise moment acts to turn the carrier member 124 clockwise seen in FIG. 14 or in the direction to disengage the intermediate gear from the pinion 119. The value of the clockwise moment is given by the product of radius of the reel portion and the tensile force of the inner wire, the latter being obtained from the residue of the length of the inner wire wound up by the reel portion before the projection 130 carried by the output gear 123 abuts against the first locking member 128 subtracted of the stroke length of the connecting rod 103 and the spring constant of the buffer spring 105. In this connection, the springs 139 and 127 must be so designed that, when the plunger 138 is drawn into the coil 118 as shown in FIG. 14, the resultant anticlockwise moment exerted to the carrier member 124 by the springs 139 and 127 is smaller than the abovementioned clockwise moment exerted by the inner wire.

The ventilator of this second embodiment operates as follows:

By the on-off switch 116 being closed, the electromagnet 136 is energized, whereby the plunger 138 is moved downward seen in FIG. 14 and accordingly the second locking member 131 is turned anticlockwise until it abuts against the stopper 133' while the carrier member 124 is also turned anticlockwise leaving the stopper 126 until the intermediate gear 121 carried thereby comes into engagement with the pinion 119, where the shoulder portion 129 of the first locking member 128 engages with the carrier member 124 to strut the latter against the clockwise moment exerted by the inner wire 106. At the same time the fan motor 108 starts to rotate, whereby the inner wire 106 is wound up around the reel portion 122 of the output gear 123 driven by the pinion 119. This condition is shown in FIG. 14. After a further rotation of the output gear 123, when the shutter blades 101 have been fully opened, the projection 130 of the output gear 123 abuts against the first locking member 128 and urges it out of the engagement with the carrier member 124 as shown in FIG. 15, whereby the carrier member is turned clockwise and accordingly the intermediate gear 121 is disengaged from the pinion 119 and in turn is engaged with the projection 134 of the second locking member 131 to check the rewinding of the inner wire 106. Therefore, the shutter blades 101 are kept at the fully opened position while the fan rotor continues to be freely driven.

If the on-off switch 116 was opened to stop the ventilator, the electromagnet 136 is deenergized, whereby the plunger 138 is pulled up by the springs 132 and 139 and accordingly the second locking member 131 is released from the intermediate gear 121, whereby the inner wire 106 is rewound by the force of the spring 104 and accordingly the shutter blades 101 are closed. At the same time the fan motor 108 stops rotation and the ventilator is restored to its rest condition as shown in FIG. 13.

If the shutter blades 101 have stuck at fully opened or closed condition due to oily dust, etc., the buffer spring 105 compensates the whole stroke of the inner wire 106 as described before, and therefore it is guaranteed that the shutter control device 110 always operates normally, that the shutter control device is exerted no abnormal force, and that there occurs neither false operation nor breakage.

Furthermore, if the on-off switch 116 was opened at the operating condition as shown in FIG. 15 and immediately thereafter the on-off switch was again closed, the pinion 119 is still rotating due to the inertia of the fan motor 108 and by the instantaneous drawing of the plunger and accordingly the instantaneous engagement of the intermediate gear 121 with the pinion 119, the operating condition as shown in FIG. 15 is quickly and smoothly recovered.

If the on-off switch 116 was closed at the rest condition as shown in FIG. 13 and was opened immediately thereafter, or in other words, if the electromagnet 136 was deenergized on the way of winding up the inner wire 106 as shown in FIG. 14, the second locking member 131 and the plunger 138 are restored to the positions shown in FIG. 13 by the spring 132, while the intermediate gear 121 is kept in engagement with the pinion 119. Since the pinion 119 continues to rotate for a while due to the inertia of the fan motor, the output gear 123 is rotated until it unlocks the first locking member 128 from the carrier member 124, whereby the shutter control device is restored to the rest condition as shown in FIG. 13. If, however, the inertia force of the fan motor was too weak to drive the output gear until it unlocks the first locking member, the output gear comes to stoppage on the way of winding up the inner wire and is held at the half way condition by the engagement of the intermediate gear 121 with the pinion 119. Therefore, the shutter blades 101 are kept at half opened condition. However, by the next closing of the on-off switch, the shutter control device starts its operation from the half way condition to accomplish the cycle and there is no danger of false operation or breakage. Considering that such a case as described in the above occurs seldom, no substantial troubles will really be encountered.

By the fact that the force for disengaging the intermediate gear 121 from the pinion 119 when the winding up of the inner wire 196 was completed or the shutter blades 101 were fully opened is supplied by the energy stored in the course of winding up the inner wire, a power means for such disengaging operation can be omitted and therefore the mechanism of the shutter control device is simplified. Further, it will be appreciated that the shutter control device of the present invention operates positively with a very simple structure including a small electromagnet, wherein all elements are operated in well balanced conditions. Since the structure described in the above is very simple, it can be applied to a small ventilator and the cost of manufacture is low.

Still another embodiment of the present invention will be explained hereinunder with reference to FIGS. 16 to 19.

In these figures, reference numeral 201 generally designates an electromotor including a stator 202 and a rotor 203, a rotor shaft 204 of which is carrying a fan motor 205. Reference numeral 206 generally designates a motor operation sensing means which is adapted to be actuated by the leakage flux of the stator when it was energized and in turn to actuate a shutter control device which is described hereinunder. The motor operation sensing means 206 includes a swing arm 208 pivotally mounted by a pin 207 and adapted to be attracted by the leakage flux of the stator 202 against the tensile force of a spring 209 when the motor 201 was energized.

The shutter control device generally designated by reference numeral 210 includes a connecting rod 213 for operating shutter blades 212 each being pivoted by a pin 211, a spring 214 biasing the connecting rod 213 to the shutter closing position, a wire 215 for shifting the connecting rod 213 to the shutter opening position against the biasing force of the spring and a gear train including an output gear 216 for winding up the wire 215, an intermediate gear 218 constantly meshing with the output gear and a clutch gear 219 for selectively engaging the intermediate gear with a pinion 217 mounted at the rear end of the rotor shaft 204, where the clutch gear 219 and other cooperating components being generally shown by reference numeral 220 as a clutch means.

The clutch gear 219 is mounted at one end of a clutch operating arm 222 which is firmly connected with the swing arm 208 and is resiliently held in its axial direction by a spring 221. The clutch means 220 is put into transmitting condition when the swing arm 208 was attracted by the stator 202 and thereby the clutch gear 219 was put into engagement with the pinion 217 and the intermediate gear 218.

Figure 16:
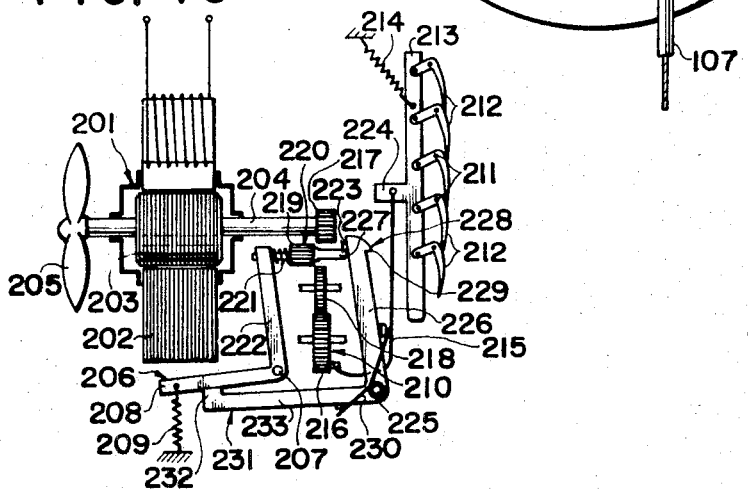

Reference numeral 223 generally designates a clutch disengaging mechanism including a lever 226 pivotally mounted by a pin 225 and adapted to engage with a projection 224 provided at the connecting rod 213 so that it is turned anticlockwise seen in FIG. 16 by being urged by the projection 224 when the shutter blades have been fully opened, and a follower 227 connected with the clutch gear 219 and adapted to disengage the clutch gear from the pinion 217 and the intermediate gear 218 against the compression spring 221 when the lever 226 was so turned anticlockwise as described in the above. The lever 226 is firmly connected with a lever 233 abutting with one end 232 thereof at the swing arm 208, and is biased clockwise seen in FIG. 16 by a spring 230.

Reference numeral 228 generally designates a shutter locking means which locks the shutter blades 212 at their fully opened position by checking the return movement of the connecting rod 213 by the ratcheting engagement of the projection 224 and a ratchet portion 229 provided at the lever 226. Therefore, the lever 226 accomplishes dual functions as the clutch disengaging means and the shutter locking means.

Reference numeral 231 generally designates a locking releasing means adapted to release the shutter locking means when the fan motor 201 was deenergized. If the fan motor was deenergized, the swing arm 208 of the motor operation sensing means 206 is turned anticlockwise seen in FIG. 16 by the tensile force of the spring 209, whereby the end 232 of the lever 233 is pushed downward and the lever 226 is turned also anticlockwise against the force of the spring 230 thereby to disengage the ratchet portion 229 from the projection 224.

The ventilator of this third embodiment operates as follows:

When the ventilator is at rest or the stator 202 is not supplied with electric current, the swing arm 208 is restored to its rest position as shown in FIG. 16 by the spring 209, and therefore the clutch gear 219 is disengaged from the pinion 217 and the intermediate gear 218 so that the shutter control device 210 is disconnected from the fan motor 201.

Figure 17:
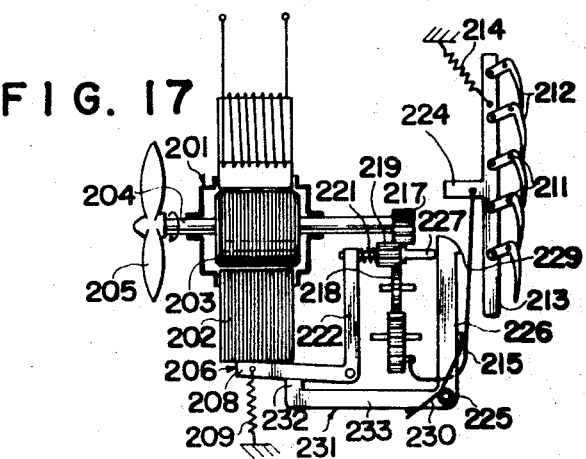
Figure 24:
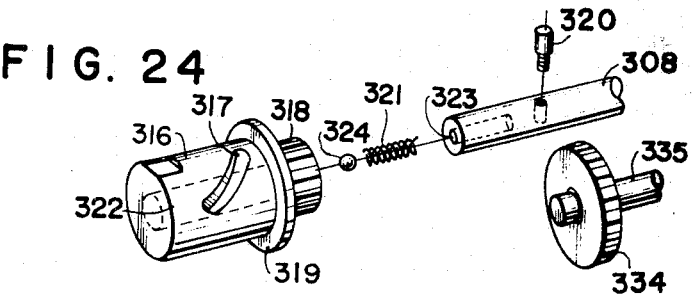
Figure 25:
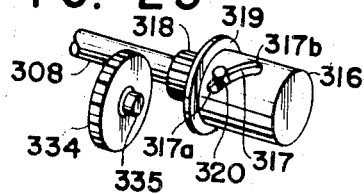
Figure 26:
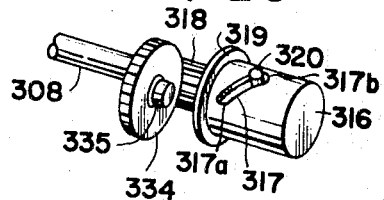
Figure 27:
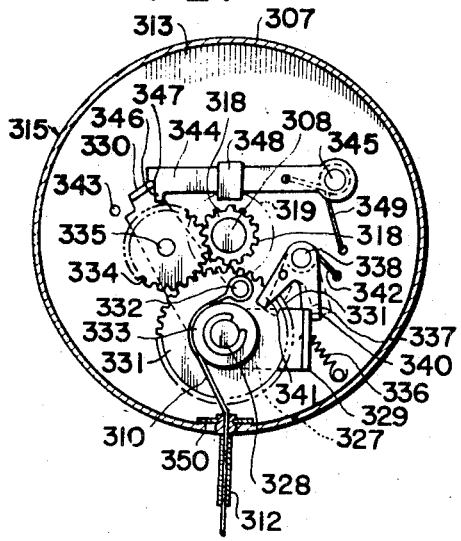

By the motor 201 being energized for operation, the swing arm 208 is attracted by the leakage flux of the stator 202 and is turned clockwise against the tensile force of the spring 209, whereby the clutch gear 219 is moved rightward seen in FIG. 17 and is put into engagement with the pinion 219 and the intermediate gear 218. Now, the rotation of the rotor shaft 204 is transmitted to the output gear 216, which winds up the wire 215, whereby the connecting rod 213 is pulled down against the tensile force of the spring 214 thereby to open the shutter blades 212. Since the lever 226 is turned clockwise by the spring 230 following to the clockwise turn of the swing arm 208, the shutter locking means 228 is moved to traverse the way of the projection 224 as shown in FIG. 17.

When the connecting rod 213 is moved downward so far that the shutter blades 212 are fully opened, the projection 224 of the connecting rod engages with the lever 226 to shift the clutch gear 219 leftward via the follower 227 while compressing the spring 221 so that the driving transmission from the pinion 217 to the intermediate gear 218 is intercepted. At the same time the projection 224 engages with the ratchet portion 229 of the lever 226, whereby the restoring of the connecting rod 213 by the spring 214 is automatically checked thereby to keep the shutter blades at the fully opened condition. Thus, the fan rotor 205 continues free operation under the full opening of the shutter (FIG. 18).

If the fan motor was deenergized to stop operation of the ventilator, the swing arm 208 is restored to its rest position as shown in FIG. 19 by the tension spring 209, whereby the levers 223 and 226 are turned anticlockwise by the engagement of the end 232 with the arm 208, whereby the ratchet portion 229 is released from the projection 224. Therefore, the connecting rod 213 is restored upward seen in FIG. 19 by the spring 214 and the shutter blades are fully closed.

From the above description, it will be appreciated that the ventilator of this third embodiment has such same advantages as those of the former embodiments that since the sufficient power of the fan motor is utilized for operating the shutter blades, the shutter blades are positively operated in spite of accumulation of oily dust around the shutter blades, that since the electric power is supplied at the time of opening the shutter blades and the closing thereof is accomplished by the energy stored at the time of opening, power loss is very small, that the shutter operation is automatically accomplished by the mere control of on-off switch for the fan motor, that since the shutter blades are positively held at the fully opened and closed positions, there occurs no fluttering of the shutter blades which will occur in case of the wind pressure opening type, and that since no means is required other than an electric power wiring for the remote control of the ventilator, the installation of the ventilator is very facilitated. Furthermore, since the shutter control device is controlled by the swing arm adapted to be attracted by the leakage flux of the fan motor in this third embodiment, there is required no separate electromagnet, whereby the structure is very simple. This structure is also applicable to small ventilators and also suited for mass production.

Still another embodiment of the present invention will be explained hereinunder with reference to FIGS. 20 to 29.

In FIG. 20, shutter blades 301 are each pivotally mounted by a pin 302 at a ventilator frame 303 and connected by a pin 305 with a connecting rod 304 so that they are simultaneously opened or closed by the movement of the connecting rod. The connecting rod is biased upward by a spring 306 so that the shutters are fully closed if the connecting rod 304 is not otherwise restricted. A fan motor 307 is carrying a fan rotor 309 and a shutter control device under a front end cover 314. A jacketed cable 312 is extending from the shutter control device and an inner wire 310 thereof is operatively connected with the connecting rod 304 via a buffer spring 311.

The shutter control device generally designated by reference numeral 315 includes a clutch element 316 integrally composed of a cylindrical portion having an inclined guide groove 317, a flange 319 and a pinion 318. The clutch element is rotatably and axially slidably mounted onto the front end portion of a rotor shaft 308 of the fan motor and a limit pin 320 planted into the rotor shaft adjacent the front end thereof is engaged in the guide groove 317. A compression spring 321 is mounted in an axial hole 323 provided at the end of the rotor shaft 308 and is urging the clutch element 316 axially out of the rotor shaft via a ball 324. The fan rotor 309 is carried by a hub 325 which in turn is mounted on the clutch element 316 and fixed by a screw 326.

When the motor 307 is not operated, the clutch element 316 is urged forward or leftward seen in FIG. 22 by the spring 321 and the limit pin 320 is abutting against the rear end 317a of the groove 317. If the motor 307 is operated, however, the relative angular position of the rotor shaft and the fan rotor is forcibly changed by the load acting on the fan rotor and accordingly the limit pin 320 is shifted along the groove 317 and abuts against the front end 317b thereof, this relative position being kept throughout the operation period of the motor 307. As the limit pin 320 is shifted from the rear end 317a to the front end 317b, the clutch element 316 is shifted rearward along the rotor shaft 308 against the force of the spring 321.

A substantially L-shaped gear carrier 327 is pivotally mounted on a front end plate 313 by a pin 328. The gear carrier is formed of end projections 329 and 330 at both ends thereof and is carrying an intermediate gear 334 which is constantly meshing with an output gear 331 rotatably mounted on the pin 328. The output gear is provided with a pin 332 to which an end of the inner wire 310 is fixed and a reel 333 for winding up the inner wire therearound. The intermediate gear 334 also meshes with the pinion 318 when the gear carrier 327 is turned clockwise seen in FIG. 23 and the clutch element 316 is pushed rearward as it is explained later.

The gear carrier 327 is biased to turn clockwise seen in FIG. 23 by a tension spring 336. Anticlockwise turn of the gear carrier 327 is locked by a V-shaped locking member 337 which is pivotally mounted on the end plate 313 by a pin 338 and has a shoulder portion 340 at one leg 339 thereof adapted to engage with the end projection 329 of the gear carrier. The other leg 341 of the locking member 337 is traversing a circular path of the pin 332 of the output gear 331. The locking member is biased to turn clockwise by a spring 342. A gear locking lever 344 having a projection 346 adapted to engage into teeth of the intermediate gear 334 to check the rotation thereof when the shutter blades are fully opened is pivotally mounted on the end plate 313 by a pin 345 and biased anticlockwise by a spring 349. The lever 344 has a shoulder portion 347 adapted to engage with the end projection 330 of the gear carrier 327 to limit the clockwise turn of the gear carrier and an arm 348 extending from a central portion thereof forward and inclining toward the rotor shaft 308 so that it operatively engages with the flange 319 of the clutch element 316 (FIG. 22). Reference numeral 350 shows a member fixing an end of the outer tube of the jacketed cable 312 to the motor frame. Reference numerals 351 and 352 show the stator and rotor of the fan motor, respectively.

The ventilator of this fourth embodiment operates as follows:

FIGS. 20 to 23 and 25 show the ventilator at the rest condition. Since the rotor shaft 308 is not rotated, the clutch element 316 is shifted forward by the compression spring 321 so far that the limit pin 320 abuts against the rear end 317a of the groove 317, whereby the pinion 318 is disengaged from the intermediate gear 334.

By the motor 307 being energized, the rotor shaft 308 is rotated, and since the rotation of the fan rotor is relatively delayed due to the load exerted thereon, the clutch element 316 is rotated with respect to the rotor shaft 308 while the limit pin 320 slides along the groove 317 until it abuts against the front end 317b, whereby the clutch element 316 is shifted rearward against the spring 321 and accordingly the pinion 318 comes into engagement with the intermediate gear 334.

As the clutch element 316 is shifted rearward as described in the above, the engagement of the arm 348 with the flange 319 is released and accordingly the gear locking lever 344 can be turned anticlockwise seen in FIG. 23 by the action of the spring 349 though it does not turn because the shoulder portion 347 thereof is engaged with the projection 330 of the gear carrier 327. In turn, the clockwise turn of the gear carrier is checked by the lever 344. At this condition, however, the projection 346 of the lever 344 is removed from the teeth of the intermediate gear 334, and the anticlockwise turn of the gear carrier is also checked by the locking member 337, the shoulder portion 340 thereof being engaged with the projection 329 of the gear carrier. At this starting condition, the pin 332 of the output gear 331 is positioned at the lowest position as shown in FIG. 23.

Figure 28:
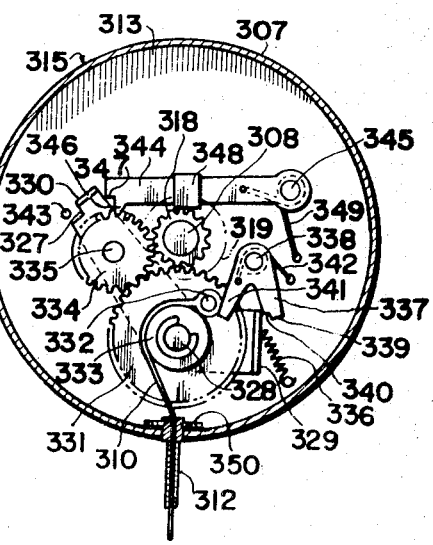

By the clutch gear 318 being engaged with the intermediate gear 334, the output gear 321 is driven by the motor 307 thereby to wind up the inner wire 310 around the reel 333 against the tensile force of the spring 306 while opening the shutter blades 301. When the shutter blades have been fully opened, the pin 332 abuts against the leg 341 of the locking member 337 and urges it against the action of the spring 342 so that the shoulder portion 340 thereof is disengaged from the projection 329 of the gear carrier 327 as shown in broken lines in FIG. 27. Now, the tensile force of the expanded spring 306 overcomes the spring 336 and turns the output gear 331 together with the gear carrier 327 anticlockwise seen in FIG. 28 against the spring 336 until it abuts against the stopper 343, whereby the intermediate gear 334 is disengaged from the pinion 318. At the same time the shoulder portion 347 of the gear locking lever 344 is released from the projection 330 of the gear carrier, whereby the lever 344 is instantaneously turned anticlockwise by the action of the spring 349 thereby to check the rotation of the intermediate gear 334 by the projection 347 thereof as shown in FIG. 28. Thus, the output gear 331 is kept as it has fully wound up the inner wire 310 and accordingly the shutter blades 301 are kept at fully opened condition, while the fan rotor is freely driven by the motor. This operating condition is shown in FIG. 29.

If the electric current to the motor 307 is intercepted, the clutch element 316 is shifted forward by the force of the compression spring 321 until the limit pin 320 abuts against the rear end 317a of the groove 317, whereby the flange 319 comes to engagement with the arm 348 of the gear locking lever 344 and urges it by the cam action of the inclined arm 348 until the projection 346 is released from the intermediate gear 334. Then, the inner wire 310 is rewound from the output gear 331 by the tensile force of the spring 306 and the shutter blades 301 are instantaneously closed. The pin 332 of the output gear is returned to its starting position as shown in FIG. 23. At this condition, the tensile force of the spring 336 overcomes that of the normally restored spring 306, whereby the gear carrier 327 is turned clockwise until the projection 329 thereof engages with the shoulder portion 340 of the locking member 337 and the intermediate gear 334 is restored to the starting position ready for engagement with the pinion 318. Thus, the whole mechanism is restored to the rest or starting condition.

Although in the above embodiment the clutching device is provided at the front end of the motor, it may be provided at the rear end of the motor as a modification as shown in FIGS. 30 and 31. In this modification, a clutch element 353 of the same kind as the clutch element 316 and having an inclined groove 354 is mounted on the front end of a rotor shaft 255 which is carrying a limit pin 356 engaged with the groove 354 and biased by a tension spring 358 toward a pin 357, while a pinion 359 corresponding to the pinion 318 is mounted on the rear en of the rotor shaft so that it controllably engages with an intermediate gear 36 corresponding to the intermediate gear 334. The other structure may be same as that shown in FIGS. 20 to 29, and the same operation will be obtained.

Furthermore, although the embodiment shown in FIGS. 20 to 29 is constituted as a mere exhaust or inhale ventilator, this embodiment can be so modified as selectively operable as an exhaust or inhale ventilator by employing a clutch element 361 having a V-shaped guide groove 362 as shown in FIG. 32 in place of the clutch member 316. Furthermore, the pinion 318 and the intermediate gear 334 may be replaced by friction wheels 363 and 364, respectively as shown in FIG. 32.

From the above description, it will be understood that the ventilator of this fourth embodiment has the same advantages as pointed out with respect to the ventilators of the former embodiments.

We claim:

1. A ventilator comprising a fan rotor, an electromotor for driving the fan rotor, a frame provided with shutter blades, and a shutter control device for opening and closing the shutter blades in accordance with the operation and stoppage of the fan rotor, characterized in that said shutter control device comprises a clutch means adapted to be so actuated by a motor operation sensing means as to drivingly connect a shutter blade opening mechanism with a rotor shaft of said motor to open the shutter blades against an elastic resisting means, a clutch disengaging means adapted to disengage said shutter blade opening mechanism from said rotor shaft when the shutter blades have been fully opened, a shutter locking means adapted to be so actuated in synchronization with said disengagement of said shutter blade opening mechanism from said rotor shaft as to lock said shutter blade opening mechanism at the condition of the shutter blades being fully opened, and a locking releasing means adapted to be so actuated by said motor operation sensing means as to release said shutter locking means to allow the shutter blades being closed by said elastic resisting means.

2. A ventilator according to claim 1, wherein said motor operation sensing means is an electromagnet and a cooperating armature, said electromagnet being laid under the control of a same on-off switch which controls said motor.

3. A ventilator according to claim 1, wherein said motor operation sensing means is an armature actuated by the leakage flux of the stator of said motor.

4. A ventilator according to claim 1, wherein said motor operation sensing means is a sleeve carrying a hub of the fan motor and mounted on the rotor shaft of said motor in a manner that a relative rotation of said sleeve with respect to said rotor shaft causes a corresponding axial shift of said sleeve by the cooperation of an inclined groove provided at said sleeve and a pin mounted on said rotor shaft, said sleeve being biased in an axial direction by a spring.

5. A ventilator according to claim 1, wherein said shutter blade opening mechanism is a reduction gear train adapted to be driven by said motor via said clutch means and including an output gear adapted to wind up a wire which is operatively connected with the shutter blades in a manner that the winding up of said wire opens the shutter blades.

6. A ventilator according to claim 5, wherein said clutch means comprises a first projection provided at the rotor shaft of said motor and a second projection engageable with said first projection and provided at an axially shiftable transmission shaft of said shutter blade opening mechanism, said transmission shaft being axially shifted between two positions so that in one of said two positions said second projection engages with said first projection so as to transmit the rotation of the rotor shaft of the motor to said transmission shaft and in the other of said two positions said second projection is disengaged from said first projection so as to isolate said rotor shaft from said shutter blade opening mechanism.

7. A ventilator according to claim 6, wherein said clutch disengaging means is a cam means adapted to be operated by a pin carried by said output gear to shift said transmission shaft to disengage said second projection from said first projection when said output gear has rotated for a predetermined angle enough to wind up a length of said wire corresponding to full opening of the shutter blades.

8. A ventilator according to claim 6, wherein said shutter locking means is a rod adapted to engage with said second projection when said transmission shaft was shifted to said other position under the condition of said motor being energized, said rod being adapted to be disengaged from said second projection when said motor was deenergized.

9. A ventilator according to claim 5, wherein said clutch means comprises an intermediate gear rotatably mounted on a carrier member in a manner that it is shifted between two positions by a pivotal turn of said carrier member so that in one of said two positions it transmits the rotation of a pinion mounted on the rotor shaft of said motor to said output gear and in the other of said two positions it isolates said pinion from said shutter blade opening mechanism.

10. A ventilator according to claim 9, wherein said clutch disengaging means comprises a strut member which struts said carrier member against the rotation to said other position until said output gear has rotated for a predetermined angle enough to wind up a length of said wire corresponding to full opening of the shutter blades, said strut member being adapted to be released from the strut engagement with said carrier member by a pin mounted on said output gear.

11. A ventilator according to claim 9, wherein said shutter locking means comprises a pivotally mounted lever, a free end of which is adapted to engage into teeth of said intermediate gear when said intermediate gear was shifted to said other position under the condition of said motor being energized, said free end being adapted to disengage from said teeth of said intermediate gear when said motor was deenergized.

12. A ventilator according to claim 9, wherein said shifting of said intermediate gear to said other position under the condition of said motor being energized is effected by the restoring force of said elastic resisting means.

13. A ventilator according to claim 1, wherein said shutter locking means is a ratchet means directly engaging with the shutter structure to hold the shutter blades at the fully opened condition.

14. A ventilator according to claim 4, wherein said groove is extending linearly inclined with respect to the axis of said sleeve.

15. A ventilator according to claim 4, wherein said groove is substantially V-shaped in a manner that the relative rotation of said sleeve with respect to said rotor shaft in both directions causes a same axial shifting of said sleeve.

16. A ventilator according to claim 5, wherein said output gear winds up the same length of said wire for the same angle of rotation regardless of the direction of rotation.

17. A ventilator according to claim 4, wherein said rotor shaft is provided with pinion to cooperate with said clutch means.

18. A ventilator according to claim 4, wherein said rotor shaft is provided with a friction wheel to cooperate with said clutch means.

References Cited

UNITED STATES PATENTS

| | | |
|---|---|---|
| 1,792,514 | 2/1931 | Spear. |
| 1,828,016 | 10/1931 | Andres. |
| 2,141,923 | 12/1938 | McMahan. |
| 2,252,179 | 8/1941 | Hueglin. |

FOREIGN PATENTS

| | | |
|---|---|---|
| 720,542 | 12/1954 | Great Britain. |

MARK NEWMAN, Primary Examiner

J. VRABLIK, Assistant Examiner

U.S. Cl. X.R.

98—116; 415—123